United States Patent
Havinal (10) Patent No.: US 10,445,205 B2
(45) Date of Patent: Oct. 15, 2019

(54) METHOD AND DEVICE FOR PERFORMING TESTING ACROSS A PLURALITY OF SMART DEVICES

(71) Applicant: WIPRO LIMITED, Bangalore (IN)

(72) Inventor: Darshan Havinal, Bellary (IN)

(73) Assignee: Wipro Limited, Bangalore (IN)

( * ) Notice: Subject to any disclaimer, the term of this patent is extended or adjusted under 35 U.S.C. 154(b) by 137 days.

(21) Appl. No.: 15/638,406

(22) Filed: Jun. 30, 2017

(65) Prior Publication Data

US 2018/0336112 A1 Nov. 22, 2018

(30) Foreign Application Priority Data

May 18, 2017 (IN) .............................. 201741017543

(51) Int. Cl.
| G06F 11/34 | (2006.01) |
| G06F 11/36 | (2006.01) |
| G06F 11/30 | (2006.01) |
| H04W 24/08 | (2009.01) |

(52) U.S. Cl.
CPC ...... *G06F 11/3404* (2013.01); *G06F 11/3466* (2013.01); *G06F 11/3688* (2013.01); *G06F 11/3003* (2013.01); *H04W 24/08* (2013.01)

(58) Field of Classification Search
CPC combination set(s) only.
See application file for complete search history.

(56) References Cited

U.S. PATENT DOCUMENTS

| 8,421,494 | B2 * | 4/2013 | Balog | G01R 31/2894 |
| | | | | 324/762.02 |
| 8,452,553 | B2 * | 5/2013 | Glickman | G06F 11/2236 |
| | | | | 702/119 |
| 9,189,378 | B1 | 11/2015 | Ryan et al. | |
| 9,613,233 | B1 * | 4/2017 | Landon | G06Q 10/20 |
| 10,020,899 | B2 * | 7/2018 | Diperna | H04B 17/11 |
| 10,171,184 | B2 * | 1/2019 | Diperna | H04B 17/11 |
| 10,255,502 | B2 * | 4/2019 | Barari | G06K 9/00684 |
| 2007/0168970 | A1 * | 7/2007 | Li | G06F 9/5038 |
| | | | | 717/124 |

(Continued)

OTHER PUBLICATIONS https://aws.amazon.com/device-farm/, Mobile App Testing on Devices—AWS Device Farm, (2018) pp. 1-6.

(Continued)

*Primary Examiner* — Amine Riad
(74) *Attorney, Agent, or Firm* — Finnegan, Henderson, Farabow, Garrett & Dunner, LLP (57) ABSTRACT

A method and device for performing testing across a plurality of smart devices is disclosed. The method includes registering the plurality of smart devices to be accessed for performing testing. The method further incudes determining at least one time-window for each of the plurality of smart devices, wherein a smart device is in an idle mode during the at least one time-window. The method includes gathering testing criteria and time duration for performing a testing operation. The method further includes dynamically creating a test group that includes one or more smart devices from the plurality of smart devices. Each of the one or more smart devices in the test group satisfy the testing criteria and the at least one time-window of each smart device in the test group is within the time duration.

17 Claims, 6 Drawing Sheets

(56) References Cited

U.S. PATENT DOCUMENTS

| | | | |
|---|---|---|---|
| 2009/0199047 A1* | 8/2009 | Vaitheeswaran | G06F 11/3409 714/47.2 |
| 2010/0034116 A1* | 2/2010 | Lin | H04L 43/50 370/253 |
| 2010/0161281 A1 | 6/2010 | Brown et al. | |
| 2013/0016207 A1* | 1/2013 | Xiong | G09G 3/006 348/92 |
| 2014/0026122 A1 | 1/2014 | Markande et al. | |
| 2015/0301071 A1 | 10/2015 | Dhan | |
| 2016/0255521 A1* | 9/2016 | Zhang | H04L 12/2809 370/252 |
| 2018/0120384 A1* | 5/2018 | Kallfelz | H04Q 9/00 |

OTHER PUBLICATIONS https://perfecto.io/, Perfecto—The Cloud-based Platform for Continuous Testing in a DevOps Environment, (2018) pp. 1-10.
Extended European Search Report issued in the European Patent Office in counterpart European Application No. 17210146.1, dated Jul. 3, 2018, 9 pages.

\* cited by examiner

METHOD AND DEVICE FOR PERFORMING TESTING ACROSS A PLURALITY OF SMART DEVICES

TECHNICAL FIELD

This disclosure relates generally to preforming testing and more particularly to method and device for performing testing across a plurality of smart devices.

BACKGROUND

In server test automation environment, server or application testing is a major milestone for commercial success of any product. For a large-scale server/application deployment, it's a huge challenge in terms of testing phase and requires bulk number of test devices to be connected to the system for various testing. In the current scenario, while virtual clients or synthetic clients are serving the purpose to some extent but they fail to address the basic requirements in the Digital Rights Management (DRM) world. If the system under test has DRM involved and subject under tests involves proprietary solutions, it's impossible to simulate the licensing using trivial simulation tools.

Usage of actual dedicated large number of devices for testing gets expensive and has limit on how many devices could be connected to the system. Additionally, availability/arranging of dedicated specific model devices for certain test in huge number is also difficult. Further, in order to scale up the number of testing devices and to keep testing of applications specific to a particular device (based on version and model), multiple number of devices are required to be procured. This is a huge overhead and moreover it is difficult and expensive.

SUMMARY

In one embodiment, a method of performing testing across a plurality of smart devices is disclosed. The method includes registering the plurality of smart devices to be accessed for performing testing, wherein the plurality of smart devices are associated with a plurality of users. The method further includes determining, by the testing device, at least one time-window for each of the plurality of smart devices, wherein a smart device is in an idle mode during the at least one time-window. The method includes gathering, by the testing device, testing criteria and time duration for performing a testing operation. The method further includes dynamically creating, by the testing device, a test group that includes one or more smart devices from the plurality of smart devices, wherein each of the one or more smart devices in the test group satisfy the testing criteria, and wherein the at least one time-window of each smart device in the test group is within the time duration.

In another embodiment, a testing device for performing testing across a plurality of smart devices is disclosed. The testing device includes a processor; and a memory communicatively coupled to the processor, wherein the memory stores processor instructions, which, on execution, causes the processor to register the plurality of smart devices to be accessed for performing testing, wherein the plurality of smart devices are associated with a plurality of users. The processor is further caused to determine at least one time-window for each of the plurality of smart devices, wherein a smart device is in an idle mode during the at least one time-window. The processor is caused to gather testing criteria and time duration for performing a testing operation. The processor is further caused to dynamically create a test group that includes one or more smart devices from the plurality of smart devices, wherein each of the one or more smart devices in the test group satisfy the testing criteria, and wherein the at least one time-window of each smart device in the test group is within the time duration.

In yet another embodiment, a non-transitory computer-readable storage medium is disclosed. The non-transitory computer-readable storage medium has instructions stored thereon, a set of computer-executable instructions causing a computer including one or more processors to perform steps that include registering a plurality of smart devices to be accessed for performing testing, wherein the plurality of smart devices are associated with a plurality of users. The steps further include determining at least one time-window for each of the plurality of smart devices, wherein a smart device is in an idle mode during the at least one time-window. The steps include gathering testing criteria and time duration for performing a testing operation. The steps further include dynamically creating a test group that includes one or more smart devices from the plurality of smart devices, wherein each of the one or more smart devices in the test group satisfy the testing criteria, and wherein the at least one time-window of each smart device in the test group is within the time duration.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
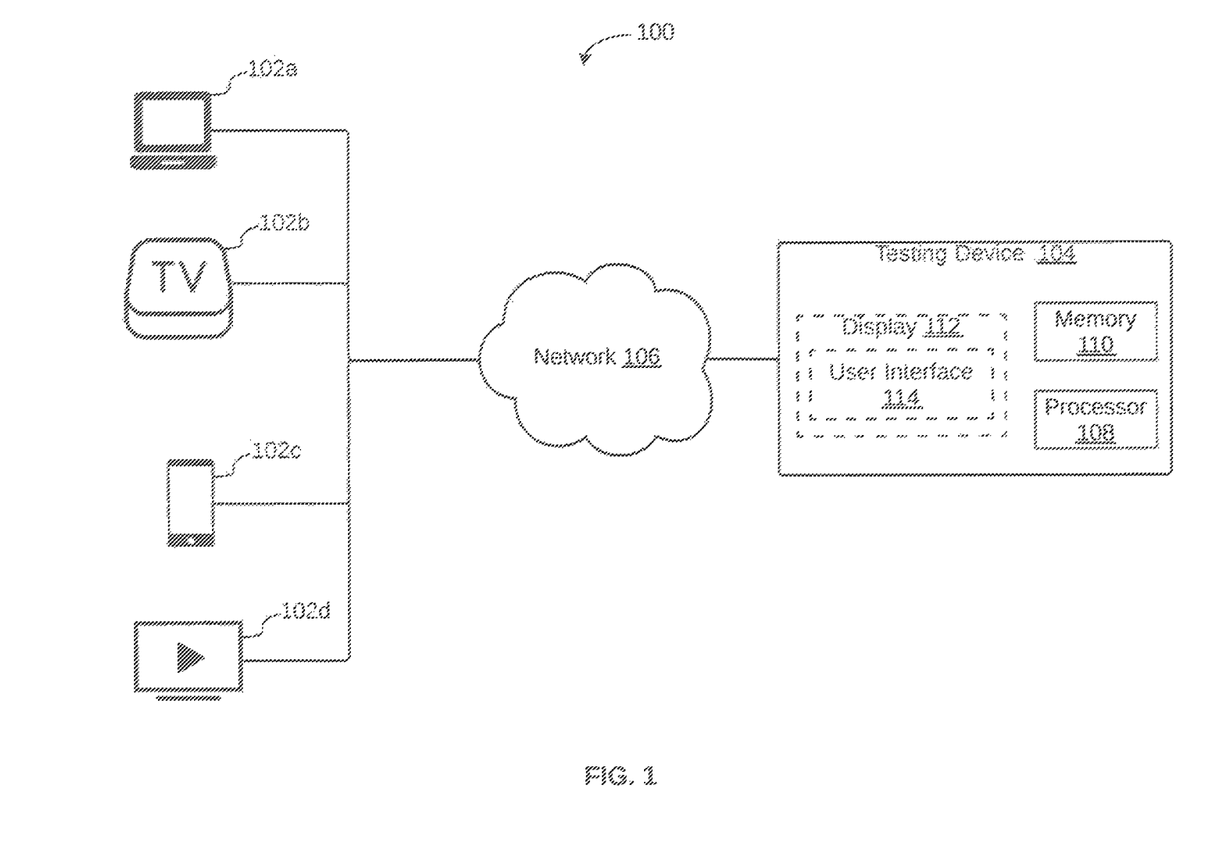
FIG. 1 is a block diagram illustrating a system for performing testing across a plurality of smart devices, in accordance with an embodiment.

Additional illustrative embodiments are listed below. In one embodiment, a system 100 for performing testing across a plurality of smart devices 102 is illustrated in FIG. 1. The testing may either be application testing, in order to test performance of an application: a smart device testing, in order to test performance of the smart device, or server testing, in order to test the load that a server can manage, when accessed by multiple smart devices at a given time. Plurality of smart devices 102 include, but are not limited to a laptop 102a, a TV streaming device 102b, a smart phone 102c, and a smart TV 102d. Other examples of plurality of smart devices 102 may include, but are not limited to a set-top box, a phablet, or a tablet. Each of plurality of smart devices 102 is associated with a user. At certain point of time (for example, late night or early mornings), one or more of plurality of smart devices 102 may be idle.

System 100 further includes a testing device 104 that communicates with one or more of plurality of smart devices 102 via a network 106 and performs testing across plurality of smart devices 102. One or more of plurality of smart devices 102 that participate in testing, thus act as test clients or test nodes. Testing device 104 may be a server controlled by an administrator or a smart device associated with a user. Network 106 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Users of one or more of plurality of smart devices 102 may register with testing device 104 in order to participate in testing. To this end, testing device 104 includes a processor 108 that is communicatively coupled to a memory 110, which may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access Memory (SRAM).

Memory 110 further includes various modules that enable testing device 104 to perform testing across plurality of smart devices 102. These modules are explained in detail in conjunction with FIG. 2. Testing device 104 may further include a display 112 having a User Interface (UI) 114 that may be used by an administrator to provide inputs and to interact with testing device 104. Display 112 may further be used to display result of the analysis performed on test results received from one or more of plurality of smart devices 102.

Figure 2:
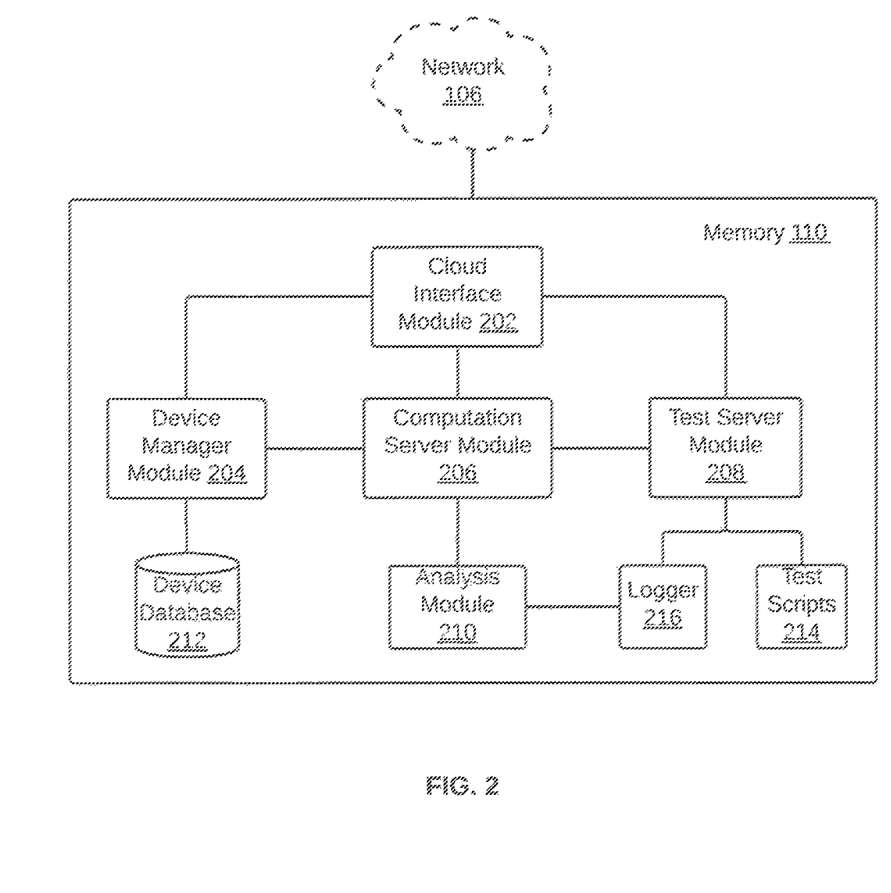
FIG. 2 is a block diagram illustrating various modules within a memory of a testing device configured to perform testing across a plurality of smart devices, in accordance with an embodiment.

Referring now to FIG. 2, a block diagram of various modules within memory 110 of testing device 104 configured to perform testing across plurality of smart devices 102 is illustrated, in accordance with an embodiment. Testing device 104 may be a server. Alternatively, testing device 104 may be a smart device, for example, a laptop, a desktop, or a smart phone. Memory 110 in testing device 104 includes a cloud interface module 202, a device manager module 204, a computation server module 206, a test server module 208, and an analysis module 210.

Cloud interface module 202 interfaces with network 106 (the cloud) and enables interaction of testing device 104 with plurality of smart device 102 via network 106. Cloud interface module 202 thus enables a client-server model in system 100, where testing device 104 acts as a server, while plurality of smart devices 102 act as test clients. Status data and control data for each of plurality of smart devices 102 are carried out by cloud interface module 202 and it abstracts other modules in memory 110.

Plurality of smart devices 102 to be accessed for performing testing are registered with device manager module 204. Thereafter, device manager module 204 periodically retrieves a plurality of parameters associated with each of plurality of smart devices 102. The plurality of parameters associated with a smart device may include, but are not limited to type of the smart device, model of the smart device, access permission granted by a user of the smart device, registration detail associated with the smart device, manufacturer of the smart device, Operating System (OS) installed on the smart device, geography associated with the smart device, current location of the smart device, various health parameters associated with the smart device, or storage space within the smart device. Device manager module 204 additionally determines one or more time-windows for each of plurality of smart devices 102, such that, a smart device is in an idle mode during associated one or more time-windows. This is further explained in detail in conjunction with FIG. 3 and FIG. 4. Data collected from plurality of smart devices 102 is stored and periodically updated by device manager module 204 in a device database 212.

Device database 212 may be used by computation server module 206 to dynamically create a test group that includes one or more smart devices from plurality of smart devices 102. Each smart device within the test group satisfy a testing criteria associated with a testing operation. Additionally, the one or more time-windows for each smart device in the test group is within a time duration required for performing the testing operation. Computation server module 206 gathers the testing criteria and the time duration for performing the testing operation from test server module 208. Computation server module 206 additionally manages test scripts 214, received from test server module 208, for various requirements. This is further explained in detail in conjunction with FIG. 3 and FIG. 4.

Test server module 208 generates test scripts 214 (or test cases) and also determines execution sequence for test scripts 214. Test scripts 214 may be generated based on issues faced during product operation and requirement of the stake holder, i.e., test requestor. Test server module 208 enables defining test criteria and time duration required for executing each of test scripts 214. The test criteria may include specific requirements for the plurality of parameters. Once computation server module 206 creates the test group, test server module 208 automatically triggers execution of associated test scripts. Once one or more of test scripts 214 have been executed, a logger 216 collects result logs associated with test execution from one or more of plurality of smart devices 102 over network 106 and aggregates them for further analysis. Analysis module 210 then gathers test results from one or more of plurality of smart devices 102 via computation server module 206 or logger 216 to perform predefined analysis for issue resolution. Result of the analysis thus performed may be displayed on dashboard via display 112. This has been explained hi detail in conjunction with FIG. 5.

Figure 3:
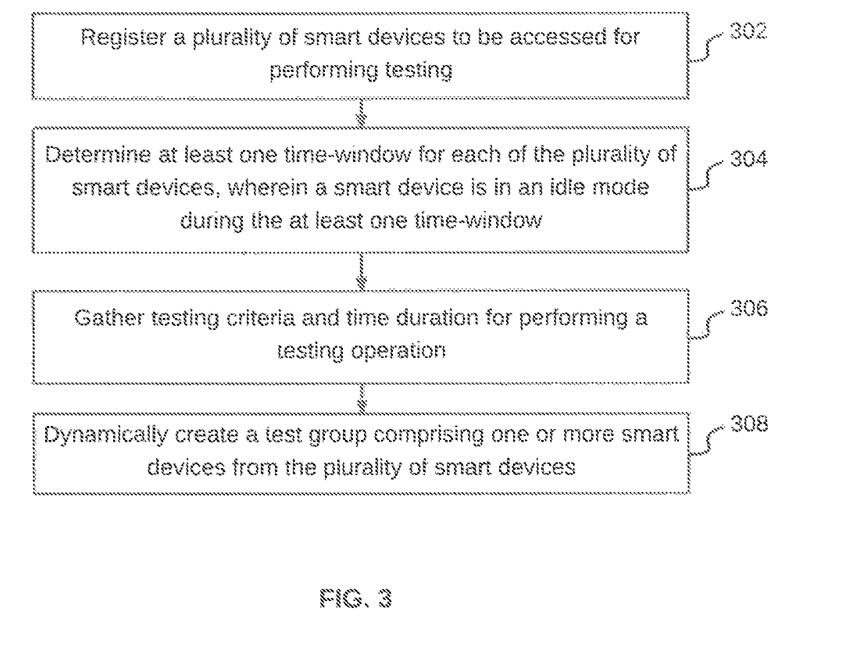
FIG. 3 illustrates a flowchart of a method of performing testing by creating a test group of smart devices, in accordance with an embodiment.

Referring to FIG. 3, a flowchart of a method of performing testing by creating a test group of smart devices is illustrated, in accordance with an embodiment. At step 302, users of plurality of smart devices 102 register associated smart devices with testing device 104, which enables testing device 104 to access one or more of plurality of smart devices 102 to perform testing. It will apparent to a person skilled in the art that multiple smart devices associated with a single user may be registered with testing device 104. While registering, the users may also provide details regarding a plurality of parameters associated with plurality of smart devices 102. The plurality of parameters associated with a smart device may include, but are not limited to type of the smart device, model of the smart device, access permission granted by a user of the smart device, registration detail associated with the smart device, manufacturer of the smart device, OS installed on the smart device, geography associated with the smart device, or storage space within the smart device.

The user of the smart device may also specify timings (day and time) during which the smart device may be available to participate in testing performed by testing device 102. By way of an example, the user may specify certain times within a day, when the user may not be using the smart device. On the contrary, the user may specify certain times when the smart device would be in use, for example, in the case of a smart TV or a media streaming device. The users may be provided with an online form to provide the plurality of parameters to testing device 104. The form may also include consent of the users through self-nominations and reward programs.

Alternatively, in response to registering plurality of smart devices 102 with testing device 104, testing device 104 may install a thin client on each of plurality of smart devices 102. In this case, the thin client may periodically monitor each of plurality of smart devices 102 to retrieve the plurality of parameters. The plurality of parameters in this case may also include current location of each of plurality of smart devices 102. In an embodiment, at first instance of registering a smart device, a user of the smart device may be required to provide the plurality of parameters associated with the smart device at the time of registration. Subsequently, after registration, the thin client may periodically retrieve the plurality of parameters and update one or more of the plurality of parameters that may have changed. The thin client would also be able to capture usage pattern of a smart device in order to determine idle times for the smart device. These idle times determined for the smart device may then be used to perform testing by testing device 104. In addition to retrieving the plurality of parameters, the thin client enables communication of a smart device with testing device 104.

Once the plurality of parameters for each of plurality of smart devices 102 have been retrieved, they are stored in a table, such that, the table includes information associated with the plurality of parameters for each of plurality of smart devices 102. In an exemplary embodiment, information associated with the plurality of parameters for a smart device may be stored as illustrated in table 1 given below:

TABLE 1

| | |
|---|---|
| Device Model | XYZ |
| Device OS | v1.0 |
| Geography | GMT + 5:30 |
| Free Window | 12:00-3:00 AM |
| Idle Since | 9 mins |
| Test Details | Not Executed |

At step 304, testing device 104 determines one or more time-windows for each of plurality of smart devices 102, such that during one or more time-windows determined for a smart device, the smart device is in an idle mode. In other words, free time-windows are determined for each of plurality of smart devices 102. In an embodiment, the thin client, installed in a smart device post registration, may automatically capture usage pattern of the smart device to determine one or more time windows during which the smart device is an idle mode. Alternatively, details regarding idle mode of the smart device may have been provided by a user of the smart device at the time of registration.

At step 306, testing device 104 gathers testing criteria for a testing operation and a time duration required for performing the testing operation. The testing operation may be a test script or a test case and may include a list of tests that are required to be executed. The testing operation may be for application testing, smart device testing, or server testing. The testing criteria may include specific requirements for one or more of the plurality of parameters retrieved for each of plurality of smart devices 102. The specific requirements may include, but are not limited to version, model, or OS (for example, Android®, Windows®, or IoS®) of a smart device that acts as a test client, Geography (time zone) to which a smart device belongs (in order to avoid latencies), or other common health parameters of a smart device. Specifying requirement for certain health parameters ensures that the user of the smart device is not affected as a result of performing a test operation using the smart device. By way of an example, testing criteria may include the following specific requirements: smart phones, located within California, having latest version of Android® OS, a minimum Random Access Memory (RAM) of 2 GB, and being idle between 11 PM to 4 AM in the pacific time zone.

Based on the testing criteria and the time duration for the testing operation, testing device 104, at step 308, dynamically creates a test group that includes one or more smart devices from plurality of smart devices 102. The test group is created, such that, each of the one or more smart devices in the test group satisfy the testing criteria. Additionally, one or more time-windows determined for each smart device in the test group is also within the time duration. By way of an example, a testing operation, for complete execution, may require a minimum duration of two hours to be executed. Thus, while forming the test group, testing device 104 selects only those smart devices that are continuously idle at least for a duration of two hours.

Dynamic selection of smart devices (that act as test clients) to form the test group works on the principle of work sharing over large qualifying smart devices and remote execution of the test operation. In this framework, remote servers under test are validated by applications running on smart devices that may be located across the geography (thus, different time zones) and connected over network 106 (or the cloud). As these test clients which are used to perform testing operations (whether for application or for a server) are physical devices which are selectively loaned from end users, the problem associated with arranging dedicated devices of specific model for certain tests, is resolved.

Figure 4:
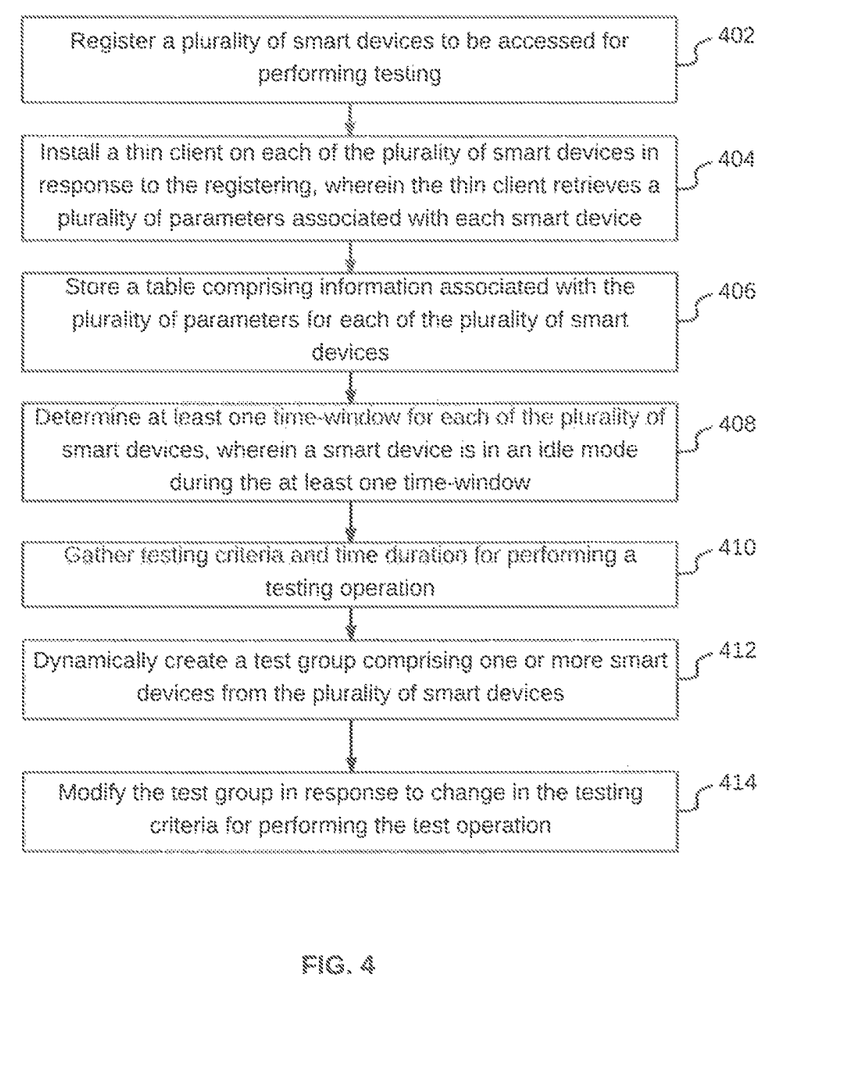
FIG. 4 illustrates a flowchart of a method of performing testing across a plurality of smart devices, in accordance with another embodiment.

Referring now to FIG. 4, a flowchart of a method of performing testing by creating a test group of smart devices is illustrated, in accordance with another embodiment. At step 402, plurality of smart devices 102 are registered with testing device 104 in order to be accessed for performing testing. In response to registration, a thin client is installed on each of plurality of smart devices 102 at step 404. The thin client enables communication of testing device 104 with each of plurality of smart devices 102. Additionally, the thin client periodically monitors each of plurality of smart devices 102 to retrieve a plurality of parameters associated with each of plurality of smart devices 102. Once the plurality of parameters have been retrieved, they are stored in a table within testing device 104 at step 406. The table includes information associated with the plurality of parameters for each of plurality of smart devices 102. This has already been explained in detail in conjunction with FIG. 3.

At step 408, one or more time-windows for each of plurality of smart devices 102 are determined, such that, a smart device is in an idle mode during associated one or more time-windows. In an embodiment, the thin client may automatically capture usage pattern of each of plurality of smart devices 102 to determine one or more time windows during which each of plurality of smart devices 102 would be in an idle mode.

At step 410, testing criteria and time duration for performing a testing operation is gathered. Based on the testing criteria and time duration, a test group that includes one or more smart devices from the plurality of smart devices is dynamically created. Each of the one or more smart devices in the test group satisfy the testing criteria. Additionally, one or more time-windows determined for each smart device in the test group is within the time duration required for the test operation to be executed. This has already been explained in detail in conjunction with FIG. 3. In case the testing criteria for performing the test operation changes, the test group may be modified at step 412. In order to modify the test group, the number or type of smart devices within the test group may be changed.

Figure 5:
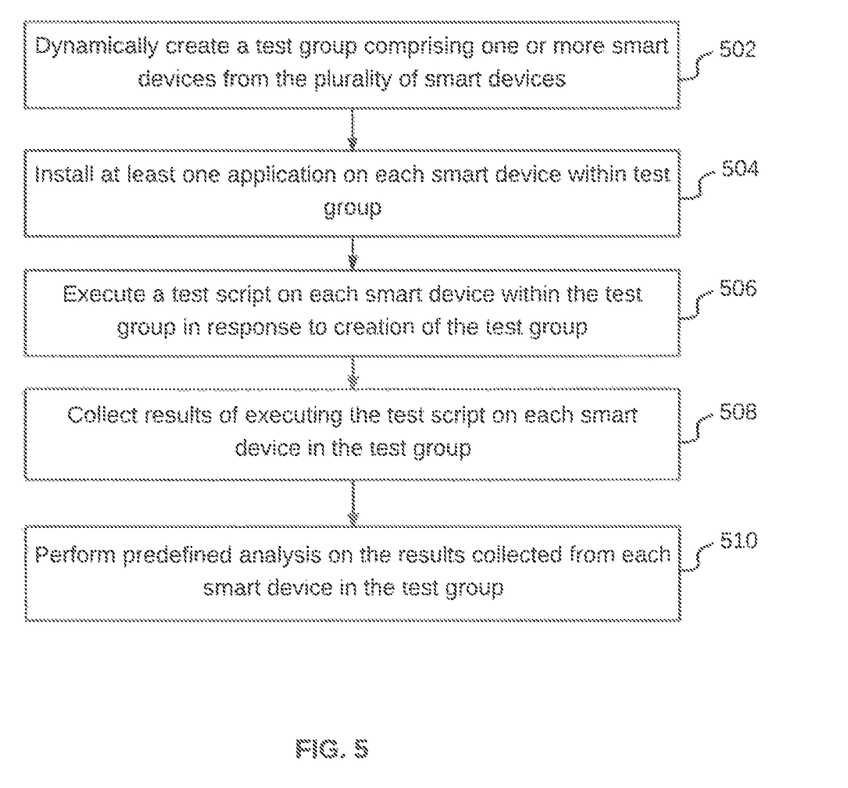
FIG. 5 illustrates a flowchart of a method of performing analysis on test results collected from each smart device in a test group, in accordance with an embodiment.

Referring now to FIG. 5, a flowchart of a method of performing analysis on test results collected from each smart device in a test group is illustrated, in accordance with an embodiment. At step 502, a test group that includes one or more smart devices from plurality of smart devices 102 is dynamically created. The test group includes smart devices that qualify the test criteria. This has been explained in detail in conjunction with FIG. 3 and FIG. 4. Once the test group has been created, one or more applications are installed on each smart device within the test group at step 504. The one or more applications facilitate a testing framework on each smart device within the test group, such that, regular functionality of no smart device is affected as a result of participating in execution of the testing operation. The one or more applications may include generic client applications and test applications.

After the one or more applications have been installed in each smart device within the test group, one or more test scripts are executed on each smart device within the test group at step 506. Certain operations may be performed by execution of the one or more test scripts (for example, download of some content or posting a message on a server etc.). The one or more test scripts enable targeted server testing, smart device testing, or application testing via smart devices in the test group. The one or more applications control execution of test scripts in the smart devices in order to carry out the necessary test scenarios. In an embodiment, the one or more test scripts may be executed simultaneously on each smart device within the test group and that too immediately after creation of the test group. This ensure that there is huge concurrency on a server that is under test. In another embodiment, smart devices within the test group are configured with a series of test scripts to be executed on a remote server. However, these test cases are executed at a later point in time, when a smart device meets the testing criteria. In yet another embodiment, execution of test scripts happens in background on the smart device.

At step 508, results of executing the test script on each smart device in the test group are collected and aggregated. The result may be received in multiple formats, which may include, but are not limited to log files or feedback forms. Thereafter, at step 510, a predefined analysis is performed on the results collected from each smart device in the test group. The predefined analysis may be performed based on requirement specified by a stake holder who requested the test operation.

Figure 6:
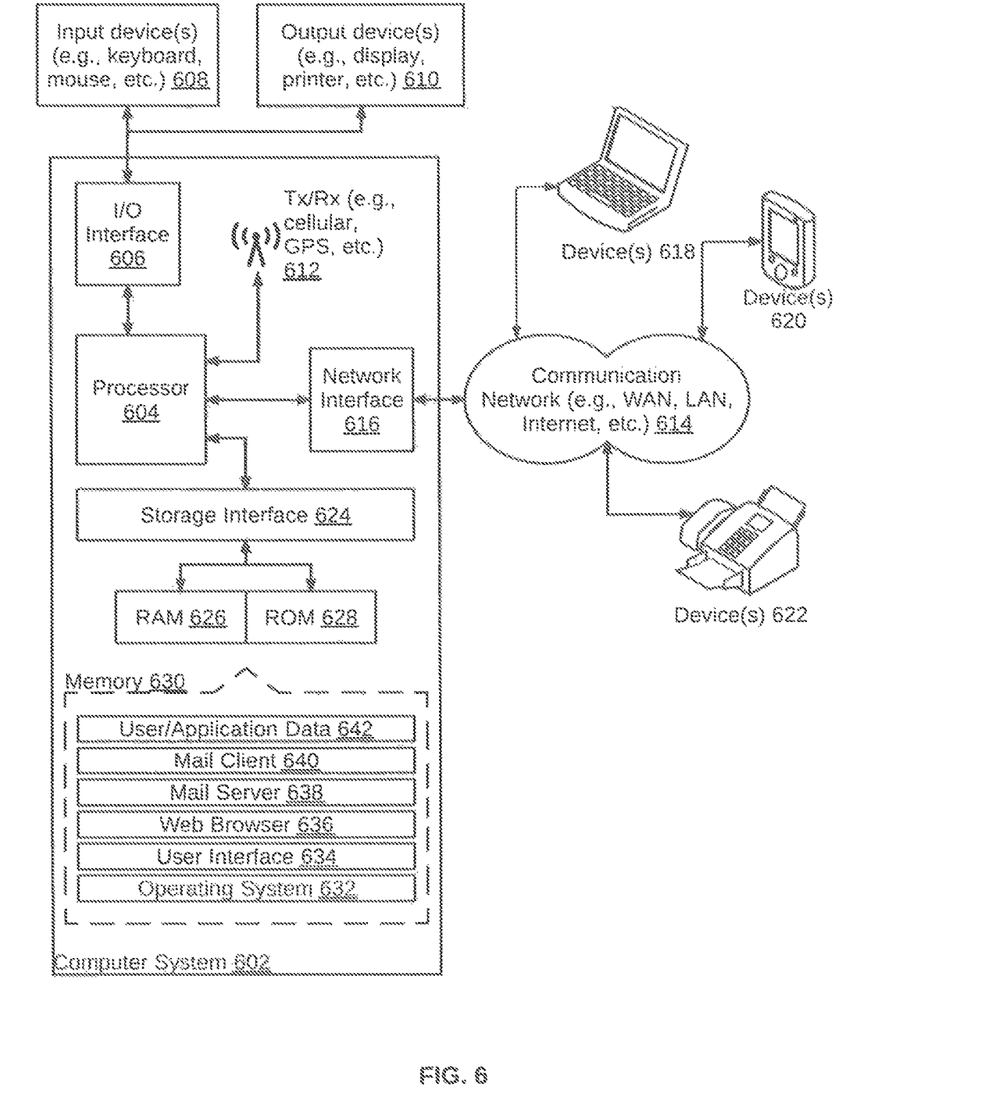
FIG. 6 illustrates a block diagram of an exemplary computer system for implementing various embodiments.

FIG. 6 is a block diagram of an exemplary computer system for implementing various embodiments. Computer system 602 may include a central processing unit ("CPU" or "processor") 604. Processor 604 may include at least one data processor for executing program components for executing user-generated or system-generated requests. A user may include a person, a person using a device such as such as those included in this disclosure, or such a device itself. Processor 604 may include specialized processing units such as integrated system (bus) controllers, memory management control units, floating point units, graphics processing units, digital signal processing units, etc. Processor 604 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 604 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 604 may be disposed in communication with one or more input/output (I/O) devices via an I/O interface 606. I/O interface 606 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 606, computer system 602 may communicate with one or more I/O devices. For example, an input device 608 may be an antenna, keyboard, mouse, joystick, (infrared) remote control, camera, card reader, fax machine, dangle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 610 may be a printer, fax machine, video display (e.g., cathode ray tube (CRT), liquid crystal display (LCD), light-emitting diode (LED), plasma, or the like), audio speaker, etc. In some embodiments, a transceiver 612 may be disposed in connection with processor 604. Transceiver 612 may facilitate various types of wireless transmission or reception. For example, transceiver 612 may include an antenna operatively connected to a transceiver chip (e.g., TEXAS® INSTRUMENTS WILINK WL1283® transceiver, BROADCOM® BCM4550IUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G 3G HSDPA/HSUPA communications, etc.

In some embodiments, processor 604 may be disposed in communication with a communication network 614 via a network interface 616. Network interface 616 may communicate with communication network 614. Network interface 616 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 614 may include, without limitation, a direct interconnection, local area network (LAN), wide area network (WAN), wireless network (e.g., using Wireless Application Protocol), the Internet, etc. Using network interface 616 and communication network 614, computer system 602 may communicate with devices 618, 620, and 622. These devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 602 may itself embody one or more of these devices.

In some embodiments, processor 604 may be disposed in communication with one or more memory devices (e.g., RAM 626, ROM 628, etc.) via a storage interface 624. Storage interface 624 may connect to memory 630 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 630 may store a collection of program or database components, including, without limitation, an operating system 632, user interface application 634, web browser 636, mail server 638, mail client 640, user/application data 642 (e.g., any data variables or data records discussed in this disclosure), etc. Operating system 632 may facilitate resource management and operation of computer system 602. Examples of operating systems 632 include, without limitation, APPLE® MACINTOSH® OS X platform, UNIX platform, Unix like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® IOS® platform, GOGGLE® ANDROID® platform, BLACKBERRY® OS platform, or the like. User interface 634 may facilitate display, execution, interaction, manipulation, or operation of program components through textual or graphical facilities. For example, user interfaces may provide computer interaction interface elements on a display system operatively connected to computer system 602, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 602 may implement a web browser 636 stored program component. Web browser 636 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA° programming language, application programming interfaces (APIs), etc. In some embodiments, computer system 602 may implement a mail server 638 stored program component. Mail server 638 may be an Internet mail server such as MICROSOFT® EXCHANGE® mail server, or the like. Mail server 638 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 638 may utilize communication protocols such as internet message access protocol (IMAP), messaging application programming interface (MAPI), Microsoft Exchange, post office protocol (POP), simple mail transfer protocol (SMTP), or the like. In some embodiments, computer system 602 may implement a mail client 640 stored program component. Mail client 640 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 602 may store user/application data 642, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide method and device for performing testing across a plurality of smart devices. The proposed solution enables generating a dynamic smart device farm, which is used for performing testing, based on idle states associated with these smart devices. As a result, the problem of having dedicated testing devices for preforming testing is solved, thereby reducing the overall operational cost. Also, the proposed solution removes the system overhead, as physical devices are managed by respective owners (volunteering individuals). Moreover, as smart devices can be registered for participating in testing from across the geography, tests can be performed throughout the day due to time zone differences. Additionally, as physical smart devices are not acquired, the system can be scaled to any number of smart devices based on the number of volunteering users. This enables performing load testing scenarios on real time smart devices, which otherwise is not feasible in conventional solutions.

The specification has described method and device for performing testing across a plurality of smart devices. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional budding blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of performing testing across a plurality of smart devices, the method comprising:
registering, by a testing device, the plurality of smart devices to be accessed for performing testing, wherein the plurality of smart devices is associated with a plurality of users;
installing, by the testing device, a thin client on each of the plurality of smart devices in response to the registering, wherein the thin client enables communication of a smart device of the plurality of smart devices with the testing device,
wherein the thin client periodically monitors the smart device to retrieve a plurality of parameters associated with the smart device that comprise location of the smart device, Operating System installed on the smart device, and storage space within the smart device;
determining, by the testing device, at least one time-window for each of the plurality of smart devices, wherein the smart device is in an idle mode during the at least one time-window;
gathering, by the testing device, testing criteria and time duration for performing a testing operation, wherein the testing criteria includes specific requirements for one or more of the plurality of parameters retrieved for each of plurality of smart devices; and
dynamically creating, by the testing device, a test group comprising one or more smart devices from the plurality of smart devices, wherein each of the one or more smart devices in the test group satisfy the testing criteria, and wherein the at least one time-window of each smart device in the test group is within the time duration.

2. The method of claim 1, wherein the plurality of parameters associated with the smart device comprise at least one of type of the smart device, model of the smart device, access permission granted by a user of the smart device, registration detail associated with the smart device, and manufacturers of the smart device.

3. The method of claim 1, wherein the testing device stores a table comprising information associated with the plurality of parameters for each of the plurality of smart devices.

4. The method of claim 1, wherein the thin client determines at least one time-window for each of the plurality of smart devices.

5. The method of claim 1 further comprising modifying the test group in response to change in the testing criteria for performing the test operation, wherein modifying the test group comprises changing the number or type of smart devices within the test group.

6. The method of claim 1, wherein the testing operation is at least one of an application testing, a smart device testing, or a server testing.

7. The method of claim 1 further comprising:
installing at least one application on each smart device within test group; and
executing a test script on each smart device within the test group in response to installing the at least one application file.

8. The method of claim 7 further comprising:
collecting results of executing the test script on each smart device in the test group; and
performing predefined analysis on the results collected from each smart device in the test group.

9. A testing device for performing testing across a plurality of smart devices, the testing device comprises:
a processor; and
a memory communicatively coupled to the processor, wherein the memory stores processor instructions, which, on execution, causes the processor to:
register the plurality of smart devices to be accessed for performing testing, wherein the plurality of smart devices is associated with a plurality of users;
install a thin client on each of the plurality of smart devices in response to the registering, wherein the thin client enables communication of a smart device of the plurality of smart devices with the testing device,
wherein the thin client periodically monitors the smart device to retrieve a plurality of parameters associated with the smart device that comprise location of the smart device, Operating System installed on the smart device, and storage space within the smart device;

determine at least one time-window for each of the plurality of smart devices, wherein the smart device is in an idle mode during the at least one time-window;

gather testing criteria and time duration for performing a testing operation, wherein the testing criteria includes specific requirements for one or more of the plurality of parameters retrieved for each of plurality of smart devices; and dynamically create a test group comprising one or more smart devices from the plurality of smart devices, wherein each of the one or more smart devices in the test group satisfy the testing criteria, and wherein the at least one time-window of each smart device in the test group is within the time duration.

10. The testing device of claim 9, wherein the plurality of parameters associated with the smart device comprise at least one of, type of the smart device, model of the smart device, access permission granted by a user of the smart device, registration detail associated with the smart device, and manufacturers of the smart device.

11. The testing device of claim 9, wherein the processor instructions further cause the processor to store a table comprising information associated with the plurality of parameters for each of the plurality of smart devices.

12. The testing device of claim 9, wherein the thin client determines at least one time-window for each of the plurality of smart devices.

13. The testing device of claim 9, wherein the processor instructions further cause the processor to modify the test group in response to change in the testing criteria for performing the test operation, wherein modifying the test group comprises changing the number or type of smart devices within the test group.

14. The testing device of claim 9, wherein the testing operation is at least one of an application testing, a smart device testing, or a server testing.

15. The testing device of claim 9, wherein the processor instructions further cause the processor to:

install at least one application on each smart device within test group; and execute a test script on each smart device within the test group in response to installing the at least one application file.

16. The testing device of claim 15, wherein the processor instructions further cause the processor to:

collect results of executing the test script on each smart device in the test group; and perform predefined analysis on the results collected from each smart device in the test group.

17. A non-transitory computer-readable storage medium having stored thereon, a set of computer-executable instructions causing a computer comprising one or more processors to perform steps comprising:

registering a plurality of smart devices to be accessed for performing testing, wherein the plurality of smart devices is associated with a plurality of users;

installing a thin client on each of the plurality of smart devices in response to the registering, wherein the thin client enables communication of a smart device of the plurality of smart devices with the testing device, wherein the thin client periodically monitors the smart device to retrieve a plurality of parameters associated with the smart device that comprise location of the smart device, Operating System installed on the smart device, and storage space within the smart device;

determining at least one time-window for each of the plurality of smart devices, wherein the smart device is in an idle mode during the at least one time-window;

gathering testing criteria and time duration for performing a testing operation, wherein the testing criteria includes specific requirements for one or more of the plurality of parameters retrieved for each of plurality of smart devices; and dynamically creating a test group comprising one or more smart devices from the plurality of smart devices, wherein each of the one or more smart devices in the test group satisfy the testing criteria, and wherein the at least one time-window of each smart device in the test group is within the time duration.

* * * * *